US007617759B2

(12) United States Patent
Bachman

(10) Patent No.: US 7,617,759 B2
(45) Date of Patent: Nov. 17, 2009

(54) PRECISION LOAD POSITIONER WITH POSITIVE WEIGHT DEVIATION INDICATION AND OVER-PRESSURE PROTECTION

(75) Inventor: John A. Bachman, Dana Point, CA (US)

(73) Assignee: Del Mar Avionics, Inc., Irvine, CA (US)

( * ) Notice: Subject to any disclaimer, the term of this patent is extended or adjusted under 35 U.S.C. 154(b) by 541 days.

(21) Appl. No.: 11/699,649

(22) Filed: Jan. 30, 2007

(65) Prior Publication Data

US 2008/0179269 A1 Jul. 31, 2008

(51) Int. Cl.
*B66C 13/04* (2006.01)
*G01L 5/08* (2006.01)

(52) U.S. Cl. .......................... 91/1; 60/413; 73/862.582

(58) Field of Classification Search ...................... 91/1; 92/5 R; 60/413; 73/168, 862.582, 862.584, 73/862.42, 826; 212/276
See application file for complete search history.

(56) References Cited

U.S. PATENT DOCUMENTS 2,500,459 A * 3/1950 Hoover et al. ............... 267/127
3,017,939 A * 1/1962 Vegors .................. 73/862.584
3,025,702 A * 3/1962 Merrill et al. .......... 73/862.582
3,110,177 A * 11/1963 Merrill et al. .......... 73/862.582
3,866,464 A * 2/1975 Franklin ................ 73/862.584
3,938,380 A * 2/1976 Karlsson .................. 73/862.56
4,143,724 A * 3/1979 Itani ........................ 177/25.14
6,474,922 B2 * 11/2002 Bachman et al. .............. 414/21

* cited by examiner

*Primary Examiner*—Thomas E Lazo
(74) *Attorney, Agent, or Firm*—William L. Chapin

(57) ABSTRACT

An apparatus for bidirectionally translating and positioning loads under tension includes a linear hydraulic actuator suspendible from a hoist such as a crane and is useable to support, raise and lower heavy loads in precisely controllable small incremental distances. The apparatus utilizes a strain-gauge type load cell positioned between an upper end of the actuator and an upper anchor connector eye suspendible from a crane. A digital display device operatively coupled to the load cell provides an accurate indication of static weight of a load supported by a load connector eye attached to a lower end of a piston rod protruding from the actuator, and accurate and immediate indications of any load weight deviation resulting from contact of a load with an obstruction while being raised or lowered. A pressure relief valve is provided to enable flow of hydraulic fluid from the actuator cylinder to a fluid reservoir to prevent inadvertent over-pressuring of the cylinder.

20 Claims, 8 Drawing Sheets

PRECISION LOAD POSITIONER WITH POSITIVE WEIGHT DEVIATION INDICATION AND OVER-PRESSURE PROTECTION

BACKGROUND OF THE INVENTION

A. Field of the Invention

The present invention relates to machinery used for lifting and lowering heavy loads. More particularly, the invention relates to an auxiliary hoist control apparatus which is suspendible from a hoisting machine such as a crane and useable to support heavy loads. The invention relates specifically to a precision load positioner which utilizes a linear hydraulic actuator to raise and lower heavy loads incrementally with respect to a hoist, a load cell weight sensor and digital display which provides accurate and immediate indications of static-load weight as well as any load weight deviation resulting from a load contacting an obstruction while being raised or lowered, and a pressure relief mechanism for preventing over-pressurizing the actuator cylinder due to operator error.

B. Description of Background Art

Most hoisting machines, or hoists, such as fixed and mobile cranes or derricks used to manipulate heavy loads, are inherently limited in the precision with which they can vertically position a load. Thus, most hoists constructed to have a capacity for raising and lowering loads which weigh thousands of pounds are incapable of positioning such loads to a precision of much less than a few inches. However, there are many situations which require vertical positioning of a load with much greater precision. For example, proper placement of a horizontal beam with respect to a vertical column often requires greater positioning accuracy than attainable with existing hoists. Similarly, the lowering of an object such as a satellite or the upper stage of a rocket with respect to a lower stage of the rocket for mating the two, or lifting an upper object to de-mate it from another object, typically requires that the upper object be lowered or raised to a precision of much less than one inch, sometimes as small as a thousandth of an inch.

A partial solution to the problem of precise vertical control of heavy objects manipulatable by a hoist was disclosed by Hoover et al., in U.S. Pat. No. 2,500,459, Work Supporting Attachment For Hoists. The attachment disclosed in Hoover et al., includes an elongated cylinder which has an upwardly protruding connector eye, supportable from a crane hook, the cylinder being filled with hydraulic fluid above and below a piston fitted at the lower end thereof with a piston rod that protrudes through a lower end wall or bulkhead of the cylinder, and has at the lower end thereof a hook for suspending a load to be positioned. The attachment includes a hydraulic fluid storage area coupled at an upper end thereof by a port to the upper part of the interior of the cylinder and at a lower end thereof through a valve port and fluid passageway to the lower interior space of the cylinder below the piston. A spring located within the cylinder and disposed between the lower end of the piston and the lower bulkhead biases the piston to an upwardly retracted position. To lower a load incrementally with respect to the crane hook, the valve is opened for an interval sufficient to allow fluid beneath the piston to be expelled through the fluid reservoir and into the upper part at the cylinder above the piston in response to a downward tension force exerted by the load on the piston rod. The device disclosed in Hoover et al., was limited in usefulness because it included no means for raising a load in small, precise increments.

In U.S. Pat. No. 3,025,702, Merrill et al., Auxiliary Hoist Control, an apparatus was disclosed which could be suspended from a hoist hook, support a heavy load, and raise as well as lower the load incrementally relative to the hoist. The disclosed apparatus includes a body in which is located a vertically elongated inner cylinder containing a piston and piston rod which protrudes through a lower cylinder head that forms a bottom end wall of the body, and which has depending downwardly therefrom a load support eye. The upper end of the cylinder is closed by an upper cylinder head which has protruding upwardly therefrom an upper connector eye for suspension from a hoist hook. The portion of the cylinder below the piston is filled with hydraulic fluid which communicates through a fluid passageway, valve port and a down-valve to the lower portion of a vertically elongated annular volume formed between an outer wall of the inner cylinder and an inner wall of an outer coaxial cylinder. A hermetically sealing separator ring longitudinally slidably positioned in the annular volume between the inner and outer cylinders separates the annular volume into a lower storage chamber and an upper storage chamber. The lower storage chamber contains hydraulic fluid. The upper storage chamber contains a compressible fluid such as nitrogen gas which is introduced through a gas input port to pressurize the upper annular space above the separator ring, to a predetermined pressure.

In the Merrill apparatus, the down-valve provides for a controlled escape of a portion of the hydraulic fluid which supports the piston within the cylinder. When the down-valve is opened, hydraulic fluid pressurized by the weight of the piston, piston rod and load attached to the lower end of the piston rod escapes through the valve into the lower annular hydraulic fluid storage chamber. As hydraulic fluid escapes from the cylinder into the lower annular storage chamber, the separator ring is forced upwards, thereby compressing the gas stored in the upper chamber. The compressed gas thus functions like the spring of a hydraulic accumulator which retains the balance of pressure throughout the system, and which provides a return force to move the piston to its upwards, retracted position, when tension on the piston rod is reduced by removing the load. This return force function is enabled by the novel design of the down-valve, as will now be described.

The down-valve is so constructed as to permit passage of hydraulic fluid from the lower annular storage chamber back into the inner cylinder when the load is removed. In other words, when the load is removed, the down valve, which previously was manually actuated to allow passage of fluid from the cylinder to the lower annular storage chamber, now functions automatically as a dump-valve to allow passage of fluid from the lower annular storage chamber back into the inner cylinder. Downward pressure exerted on the separator ring by compressed gas in the upper chamber pressurizes hydraulic fluid in the lower annular storage chamber. Re-admission of hydraulic fluid thus pressurized into the inner cylinder forces the piston back upwards to a retracted position.

The auxiliary hoist control apparatus includes an up-pump for raising the piston and an attached heavy load in small, precisely controlled increments, e.g., one one-thousandths of an inch for a 12-inch travel piston supporting a 5-ton weight. The up-pump functions by withdrawing hydraulic fluid from the lower fluid storage chamber and injecting the fluid into the lower part of the inner cylinder, below the piston.

Loads in excess of twenty tons are accurately positionable using the auxiliary hoist control disclosed in Merrill et al., U.S. Pat. No. 3,025,702. That hoist control includes a return force gauge consisting of a pressure gauge which has an input port and gas passageway which communicates with the annular compressible gas storage area above the separator ring. The return force gauge is calibrated in pounds force exerted downwardly by the compressed gas on the separator ring. In a typical application of the auxiliary hoist control, nitrogen gas is introduced into an inlet port of the upper annular gas storage area at a pressure sufficient to provide a return force which is a fraction of the weight of a load to be positioned using the apparatus. For example, if an auxiliary hoist control of the type described has a capacity of 10,000 pounds and is being used to position a 5,000-lb. load, the upper annular gas storage chamber may be pressurized with nitrogen gas to provide a downward return force on the separator ring of 100 pounds force, as indicated on the return force gauge. In effect, adjusting the initial pressure within the upper annular gas storage chamber to produce a particular return force simulates the effect of having an adjustable spring constant compression spring disposed longitudinally within the upper annular gas storage chamber, between the upper surface of the separator ring and the lower, inner surface of the upper cylinder head.

The auxiliary hoist control disclosed in the '702 patent also has a hydraulic fluid pressure gauge mounted on the body of the apparatus. The gauge has a relatively large face which is readable from a substantial distance, is coupled through a fluid passageway to the lower end of the inner hydraulic fluid cylinder below the piston, and is calibrated in pounds force exerted by a load suspended from the lower end of the piston rod. Thus, a 5,000-lb. load which is hung from the support eye at the lower end of the piston rod exerts a downward tension load on the rod which in turn is exerted on the piston and causes the piston to exert downward pressure on hydraulic fluid between the piston and lower cylinder head of the apparatus, producing a weight reading of 5,000 lbs. on the load weight gauge.

Rather than merely indicating to an operator the static weight of a load suspended from the auxiliary hoist control, the load weight gauge serves an additional important function. Thus, if a load is being lowered in a mating operation towards an object with which the load is to be mated, by operation of the down valve, for example, the reading on the load force gauge should remain constant. However, if the load is subjected to any sort of a resisting force in its downward travel, such as colliding with an underlying obstruction or sticking within the bore of a pipe, etc., the load gauge reading will decrease. This negative load deviation indication provides an immediate indication to an operator of a problem in the positioning of the load which requires corrective action.

Similarly, when a load is being raised, as in a de-mating operation, an increase in the load gauge reading provides an immediate indication to an operator of an overlying obstruction problem which must be corrected. Thus it can be appreciated that load deviation indication by the load force gauge is an important function of the auxiliary hoist control. However, the use of a hydraulic pressure gauge in the auxiliary hoist control of the '702 patent is problematic for the following reason. When the up-pump is operated to raise a load, the injection of hydraulic fluid by the pump into the lower portion of the inner cylinder below the piston causes a transient dynamic over-pressure in the hydraulic fluid. The magnitude of the transient dynamic over-pressure can be a significant fraction of total force reading on the load force gauge, e.g., 200 lbs. For a 5,000 lb. Load. The transient pressure increase indication gives a false load deviation indication to an operator, thus requiring him to interrupt what was a normal lifting operation to search for a non-existent problem. The present invention was conceived to provide a precision load positioner apparatus which incorporates desirable features of the auxiliary hoist control disclosed in the '702 patent, but which also provides an essentially error-free, immediate indication of load deviation and a mechanism to prevent over-pressuring the apparatus.

OBJECTS OF THE INVENTION

An object of the present invention is to provide a bi-directional linear hydraulic actuator apparatus which is capable of exerting tensional forces of several tons or more over a distance range of a foot or more, and capable of moving multi-ton loads in precisely controllable increments of one-thousandth of an inch or less.

Another object of the invention is to provide a precision load positioner apparatus for placement between a hoist such as a crane or derrick and a heavy load, and precisely raising and lowering the load incrementally with respect to the hoist.

Another object of the invention is to provide a precision load positioner apparatus which provides an accurate, immediate indication of weight of a load suspended from a hydraulic actuator piston of the apparatus, independent of transient variations of fluid pressure within the cylinder.

Another object of the invention is to provide a precision load positioner apparatus which provides accurate and immediate indication of static load weight, and of deviations in indicated weight of a suspended load being elevated or lowered by operation of the positioner which encounters an obstruction, while avoiding false indications of load deviation as a result of transient pressure variations within a hydraulic actuator of the apparatus used to raise and lower loads.

Another object of the invention is to provide a precision load positioner apparatus which utilizes a tensionable load cell between an upper hydraulic cylinder head and an upper anchor connector eye of the apparatus to measure load weight exerted by a load suspended from a lower load support connector eye fixed to the lower end of a piston rod protruding through a lower cylinder head of the hydraulic cylinder.

Another object of the invention is to provide a precision load positioner apparatus which utilizes a tensionable load cell electrically coupled to a visual digital display device to indicate the weight of a load suspended from the positioner.

Another object of the invention is to provide a precision load positioner apparatus which uses a tensionable load cell positioned between the upper head of an actuator cylinder of the apparatus and an upper anchor connector eye, the load cell producing an output voltage proportional to tensional force exerted between the upper anchor connector eye and a lower load-support connector eye, which is input to a visual digital display to indicate load weight, and an over-pressure relief valve which has an inlet port and fluid passageway connected to an inner hydraulic actuator cylinder and an outlet port and fluid passageway connected to a hydraulic fluid reservoir, to limit pressure within the inner cylinder to a predetermined maximum value.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends an accessory apparatus for use with hoisting machinery and comprises a precision load positioner which includes an upper anchor connector eye for suspending the apparatus from a hoist hook and a lower load support connector eye for suspending a load. The precision load positioner apparatus according to the present invention includes a body in which is located a vertically elongated inner hydraulic cylinder containing a piston and piston rod that protrudes through a lower cylinder head which forms a bottom end wall of the body, and which has depending downwardly therefrom a load support connector eye. The upper end of the cylinder is closed by an upper cylinder head which has protruding upwardly therefrom an upper anchor connector eye for suspension from a hoist hook. The portion of the cylinder below the piston is filled with hydraulic fluid which communicates through a fluid passageway, valve port and a down-valve to the lower portion of a vertically elongated annular volume formed between an outer wall of the inner cylinder and an inner wall of an outer coaxial cylinder. A hermetically sealing separator ring longitudinally slidably positioned in the annular volume between the inner and outer cylinders separates the space into a lower hydraulic fluid storage reservoir chamber and an upper gas storage chamber for a compressible fluid such as nitrogen gas which is introduced through a gas input port to pressurize an upper annular space above the separator ring to a predetermined pressure.

The down-valve of the apparatus provides for a controlled escape of a portion of the hydraulic fluid which supports the piston within the cylinder. When the down-valve is opened, hydraulic fluid pressurized by the weight of the piston, piston rod and load attached to the lower end of the piston rod escapes through the valve into the lower annular hydraulic fluid storage chamber. As hydraulic fluid escapes from the cylinder into the lower annular storage chamber, the separator ring is forced upwards, thereby compressing the gas stored in the upper chamber. The compressed gas thus functions as a spring which retains the balance of pressure throughout the system, and which provides a return force to the piston to its upwards, retracted position, when tension on the piston rod is reduced by removing the load. This return function is enabled by the design of the down-valve, as will now be described.

The down-valve is so constructed as to permit passage of hydraulic fluid from the lower annular storage chamber back into the inner cylinder when a load which exerts tension on the piston rod is removed. In other words, when the load is removed, the down valve, which previously was manually actuated to allow passage of fluid from the inner cylinder to the lower annular storage chamber between the inner and outer cylinders, now functions automatically as a dump-valve to allow passage of fluid from the lower annular storage area back into the inner cylinder. Downward pressure exerted on the separator ring by compressed gas in the upper chamber pressurizes hydraulic fluid in the lower annular storage chamber. Re-admission of hydraulic fluid thus pressurized into the inner cylinder forces the piston back upwards to a retracted position.

The auxiliary hoist control apparatus includes an up-pump for raising the piston and an attached heavy load in small, precisely controlled increments, e.g., one one-thousandths of an inch for a 12-inch travel piston supporting a 5-ton weight. The up-pump functions by withdrawing hydraulic fluid from the lower fluid storage chamber and injecting the fluid into the lower part of the inner cylinder, below the piston.

The precision load positioner according to the present invention includes a strain-gauge type load cell force-sensing transducer positioned longitudinally between the upper cylinder head of the actuator cylinder assembly, and the upper, anchor connector eye. The strain gauge transducer is electrically coupled through a cable to a digital display device, preferably a light emitting diode (LED) display which is readily viewable by an operator who may be located a substantial distance away from the apparatus. A tensional force exerted on the load connector eye at the lower end of the piston rod by the weight of a suspended load is transmitted through the piston rod, piston, immobile hydraulic fluid below the piston, through the device housing and strain gauge to the upper anchor connector eye and hoist. Thus, the LED display provides an accurate, immediate reading of load weight, not only when the load is static, but also when the up-pump or down-valve is being used to raise or lower a load.

Replacement of a hydraulic pressure gauge to indicate load weight by a load cell and digital force display device solves the problem of false load deviation readings caused by dynamic pressure transients within the hydraulic cylinder when the up-pump is operated. However, elimination of the hydraulic pressure gauge presents a problem. Thus, if the up-pump handle is manipulated to retract the piston, no indication is provided that the pump handle has been operated through a sufficient number of cycles to pressurize hydraulic fluid below the piston to a value which exceeds design limits. Thus, when the hydraulic pressure gauge is replaced by a load cell and display device, no indication of over-pressure within the hydraulic cylinder is provided; therefore, an operator may inadvertently pressurize the hydraulic fluid to a value great enough to rupture piston O-rings, thus causing serious damage to the apparatus. Over-pressurization of the hydraulic cylinder can occur in normal operation when the piston within the inner cylinder is at the upward limit of its travel, abutting the upper cylinder head, and the operator continues to operate the up-pump. According to the present invention, this problem is solved by providing the precision load positioner with load cell weight load sensor and digital indicator with a pressure relief valve. That valve has an input port which communicates through a fluid inlet passageway with hydraulic fluid below the piston in the inner cylinder, and an output port which communicates through a fluid output passageway with the lower annular hydraulic fluid reservoir. The relief valve is constructed to have an actuation, “cracking” or opening pressure which is close to the design pressure limit of the hydraulic actuator cylinder, e.g., 2000 psi gauge for a design limit of 1800 psig. With this arrangement, maximum pressure within the inner cylinder is limited to a predetermined maximum pressure.

BRIEF DESCRIPTION OF THE DRAWINGS

FIG. 1 is a front elevation of a prior art auxiliary hoist control and of an actuator portion of the present invention.

FIG. 2 is a front elevation in section of the auxiliary hoist control of FIG. 1.

FIG. 3 is a sectional view taken along lines 3-3 of FIG. 1 with the down valve assembly and up-pump assembly removed.

FIG. 4 is a fragmentary elevation taken along lines 4-4 of FIG. 1, partially in section.

FIG. 5 is a sectional view of the up-pump of the auxiliary hoist control.

FIG. 6 is a section view of the down-valve of the auxiliary hoist control.

FIG. 7 is an enlarged partial sectional view of the down valve and piston, illustrated in FIG. 6.

FIG. 8 is a further enlarged partial sectional view of the down valve and piston illustrated in FIG. 6.

FIG. 9 is a front elevation view of a precision load positioner apparatus with positive over-pressure protection and weight deviation indication according to the present invention.

FIG. 10 is a side elevation view of the apparatus of FIG. 9.

FIG. 11 is an upper transverse sectional view of the apparatus of FIG. 9, taken in the direction of line 11-11.

FIG. 12 is an intermediate transverse sectional view of the apparatus of FIG. 9, taken in the direction of line 12-12.

FIG. 13 is a longitudinal sectional view of a cylinder head space air breather cap of the apparatus of FIG. 9, on an enlarged scale and taken in the direction of the double arrowhead arc A.

FIG. 14 is a longitudinal sectional view of a compressible fluid inlet port of the apparatus of FIG. 9, on an enlarged scale and taken in the direction of the double arrowhead arc B.

FIG. 15 is a fragmentary longitudinal sectional view of the apparatus of FIG. 9, taken in the direction of the double arrowhead arc C and showing a gas passageway between an upper annular compressible fluid storage area and a return force gauge of the apparatus.

FIG. 16 is a fragmentary longitudinal sectional view of the apparatus of FIG. 9, taken in the direction of the double arrowhead arc D and showing details of a hydraulic fluid addition passageway, piston rod wiper ring, O-ring and retainer ring, and separator ring and sealing O-rings.

FIG. 17 is a fragmentary side elevation view, partly in section, of the apparatus of FIG. 10.

FIG. 18 is a lower transverse sectional view of the apparatus of FIG. 17, taken in the direction of line 18-18.

DESCRIPTION OF THE PREFERRED EMBODIMENTS

The precision load positioner according to the present invention utilizes components which are similar in structure and function to the prior art auxiliary hoist control in Merrill et al., U.S. Pat. No. 3,025,702, assigned to the assignee/applicant of the present invention. Accordingly, an understanding of the novel and advantageous advancements of the present invention over the prior art may be facilitated by reviewing the following description referring to FIG. 1, which illustrate a prior art auxiliary hoist control, and FIGS. 2-9, which illustrate structural features common to both the prior art auxiliary hoist control and the precision load positioner according to the present invention.

Figure 1:
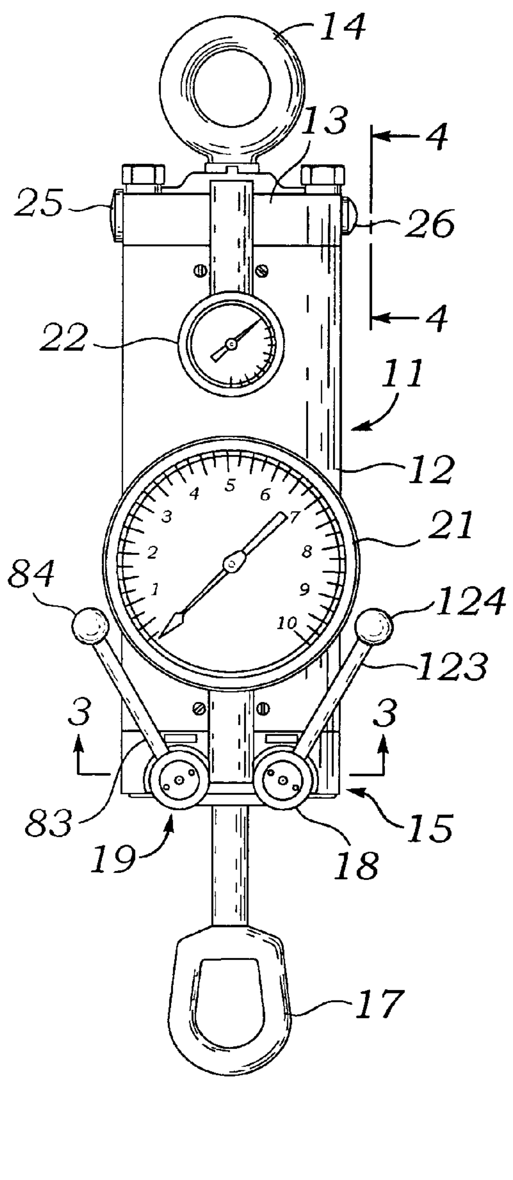
Fig. 1 (PRIOR ART)
FIG. 1 illustrates a prior art auxiliary hoist control.

Referring to FIG. 1, there is shown an auxiliary hoist control 11 which consists principally of a body portion 12, and upper head 13, to which a top eye 14 is connected, and a lower head 15. A rotatable socket having a lower eye 17 is connected to a shaft extending through the lower head 15. The lower head 15 has a down valve assembly 18 and an up-pump assembly 19 extending therethrough. A hydraulic fluid pressure gauge 21 and a compressible fluid pressure gauge 22 are located on the body portion 12 of the auxiliary hoist control. A compressible fluid filler plug 25 closes a compressible fluid addition inlet (see FIG. 2). A breather cap 26 vents the space above the piston to the atmosphere through a passage 27 (see FIG. 2) in the upper head.

Figure 2:
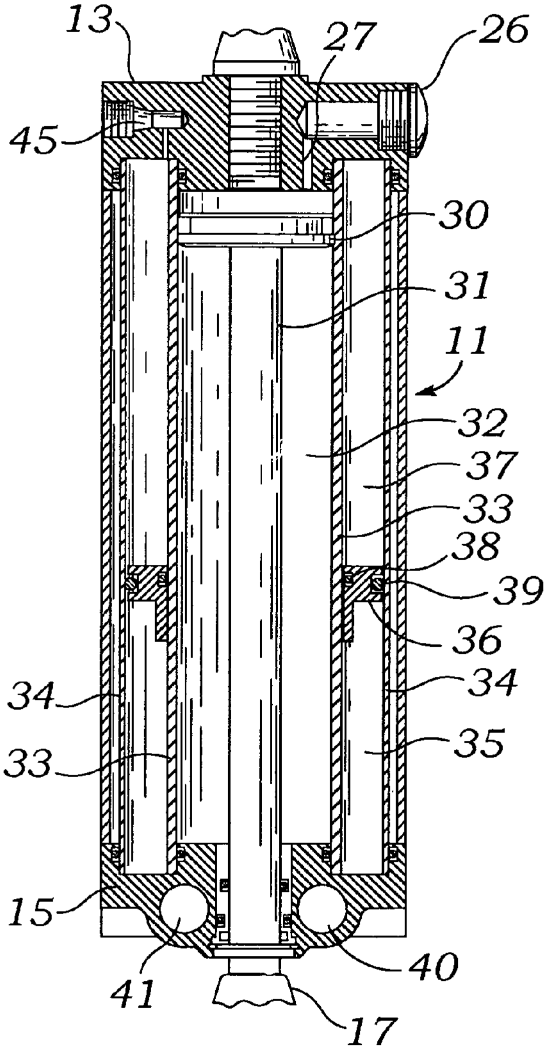
FIGS. 2-8 illustrate features common to both the prior art auxiliary hoist control and the precision load positioner apparatus of the present invention and FIGS. 9-18 illustrate the present invention.

FIG. 2 shows a sectional elevation of the auxiliary hoist control 11 of FIG. 1. A piston 30 is connected to a piston rod 31, the lower end of which is attached to the lower eye 17. The piston is inserted in an inner cylinder 32 having a wall 33. Concentric about the inner cylinder 32 there is positioned a second, outer cylinder 34 so as to form a concentric annular volume with respect to the inner cylinder 32. This annulus has a lower portion 35 which is divided by a solid brass separator ring 36 from an upper portion 37. The lower portion 35 is used as, and hereinafter referred to as, the hydraulic fluid storage area. The upper portion 37 is used as, and hereinafter referred to as, the compressible fluid storage area. The separator ring 36 has an inner O-ring 38 and outer O-ring 39 which assist in forming a seal between the two storage areas.

A down-valve assembly bore 40 and an up-pump assembly bore 41 are located in the lower head assembly 15.

Figure 3:
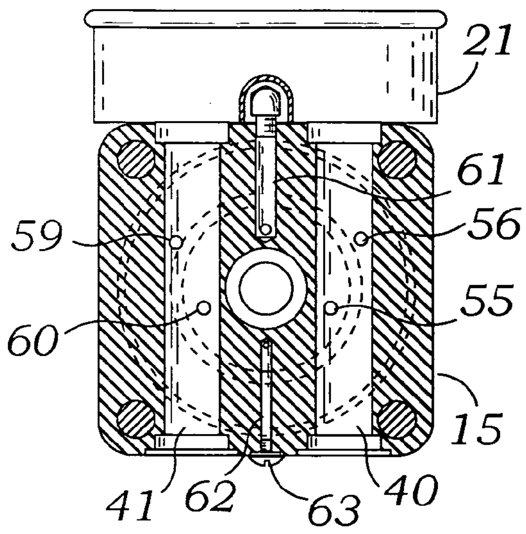
Figure 5:
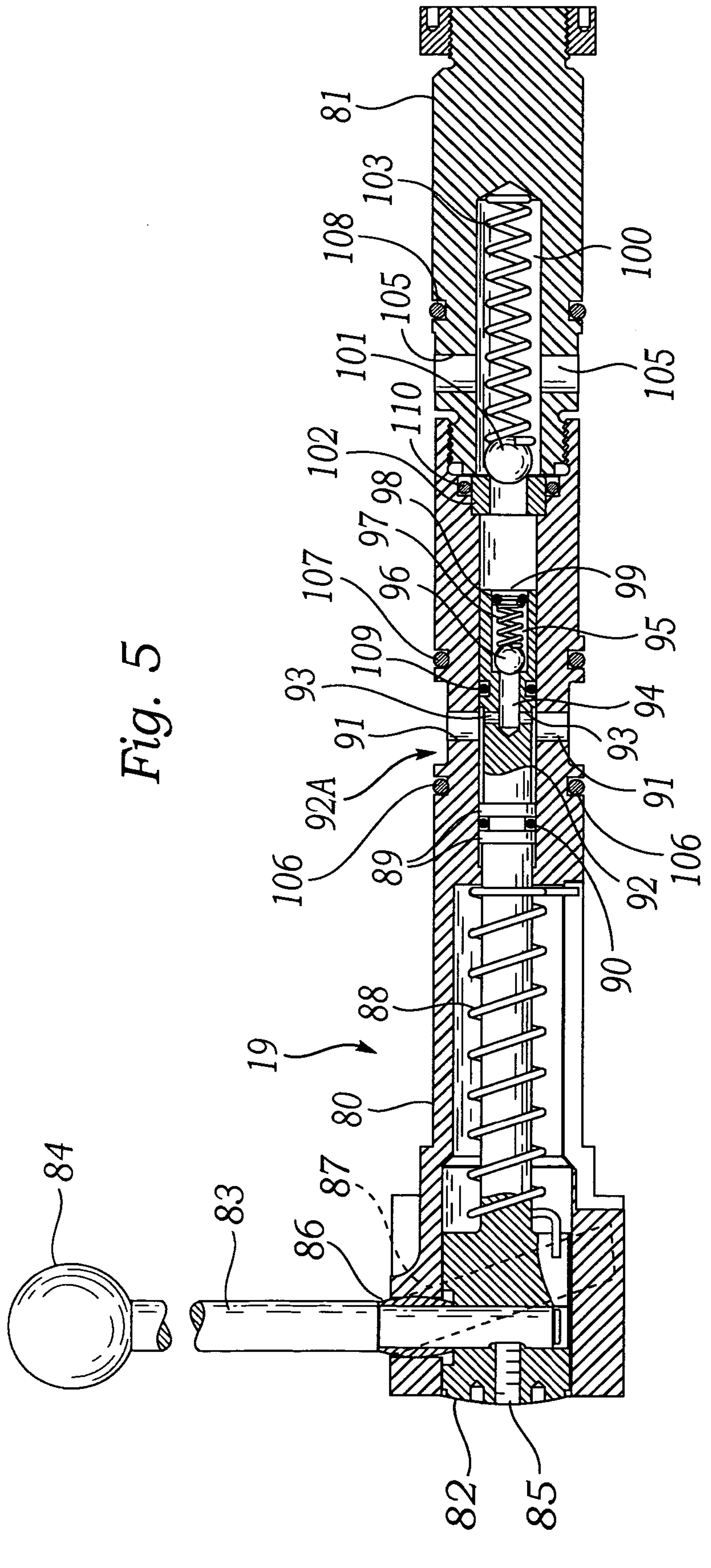
Figure 6:
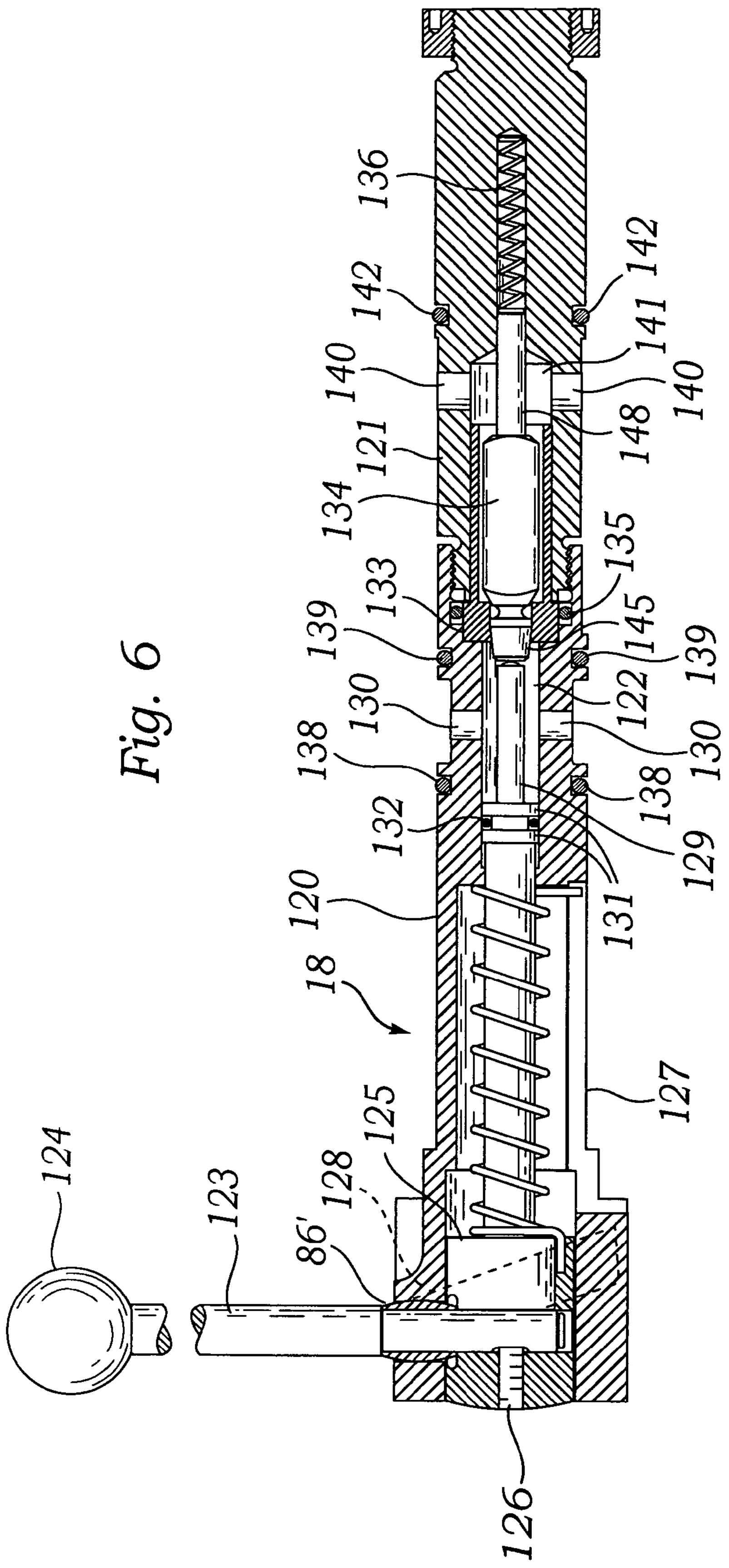

FIG. 3 is a sectional view of the lower head 15. Two bores 40 and 41 contain the down valve assembly 18 and the up-pump assembly 19 respectively, which assemblies are not shown in FIG. 3 for purposes of clarity. Partial sections of these assemblies are shown in FIGS. 5, and 6. A down valve assembly inlet hole 55 and outlet hole 56 provide apertures for by-passing hydraulic fluid from the inner cylinder into the hydraulic fluid storage area by means of the down valve assembly. Up-pump inlet and outlet holes 59 and 60 provide apertures for withdrawing hydraulic fluid from the storage area and injecting the fluid into the inner cylinder in conjunction with the up-pump assembly 19. A gauge passage 61 connects the inner cylinder to the hydraulic fluid pressure gauge 21. A hydraulic fluid addition passage 62 is closed by a cap 63.

Hydraulic fluid is contained in the inner cylinder 32. When a tensioning load is applied between the top eye 14 and the lower eye 17, the hydraulic pressure exerted by the hydraulic fluid in the inner cylinder 32 increases. Through the action of the down valve assembly, as will subsequently be described, this hydraulic fluid is selectively passed from the inner cylinder 32 into the hydraulic fluid storage area 35. A decrease in volume of hydraulic fluid contained in the inner cylinder 32 due to the movement of the piston 30 in response to the tensioning load, will result in the movement of the piston rod 31 out of the lower head assembly 15 in proportion to the amount of hydraulic fluid passed into the hydraulic fluid storage area 35.

An increase in volume of the hydraulic fluid stored in the hydraulic fluid storage area 35 will move the separator ring 36 in a direction toward the upper head 13. Air, nitrogen or other compressible fluid is normally stored in the compressible fluid storage area 37. The movement upward of the separator ring 36 will compress the fluid stored in the compressible fluid storage area 37 in proportion to the amount of movement of the separator ring 36 which occurs, and therefore in proportion to the amount of hydraulic fluid transferred from the cylinder 32 to the hydraulic fluid storage area 35. As will become apparent from the description below, the foregoing components of hoist control function as an accumulator which provides a return force to move piston 30 to the upward, retracted position when tension on the piston rod is reduced by removing a load from the lower load support connector eye.

The auxiliary hoist control 11 is so constructed that there is an appreciable difference between the cross sectional area of the storage areas 35 and 37 and the cross sectional area of the cylinder 32. The proportioning of these cross sectional areas permits the ultimate capacity of the unit to be widely varied so long as the structural limitations of the unit are not exceeded.

For example, assuming that there is a 1:2 ratio between the storage cross section and the cylinder cross section areas, the force which the compressible fluid will be required to exert on the separator ring, and consequently, on the hydraulic fluid, in order to exactly counterbalance a 20,000 pound tensioning force applied across the auxiliary hoist 11 will be only 10,000 pounds. If the cross section area of the cylinder 32 is 50 square inches, when the compressible fluid has been compressed to a pressure of 400 pounds per square inch, the system will be in equilibrium.

Assuming that the piston and piston rod are in their fully retracted position, the position shown in FIG. 2, and the compressible fluid in the upper annular area is at atmospheric pressure, when the piston is subsequently moved toward the lower head 15 by a tensioning force of 20,000 pounds, the system will be in equilibrium when the compressible fluid is compressed to approximately one twenty-fifth of its original volume.

However, if the pressure existing in the compressible fluid area is appreciably greater than ambient pressure when the piston 30 and piston rod 31 are in their fully retracted position, the application of a tensioning load of 20,000 pounds will cause the required 10,000 pounds force to be exerted by the compressible fluid upon the separator ring prior to the piston travel required for equilibrium in the preceding case. Thus, by pre-pressuring the upper annular storage area, it is possible to limit the ultimate extension of the auxiliary hoist in accordance both with the tension load applied and with the pre-pressuring used.

Pre-pressuring of the compressible fluid storage area may be accomplished through a compressible fluid inlet 45 (FIG. 2). By means of this pre-pressuring facility, the auxiliary hoist control may be also utilized as a tension measuring device. Thus, knowing the pressure initially existing in the compressible fluid area, the tension exerted may be measured by the amount of extension of the piston rod.

Figure 4:
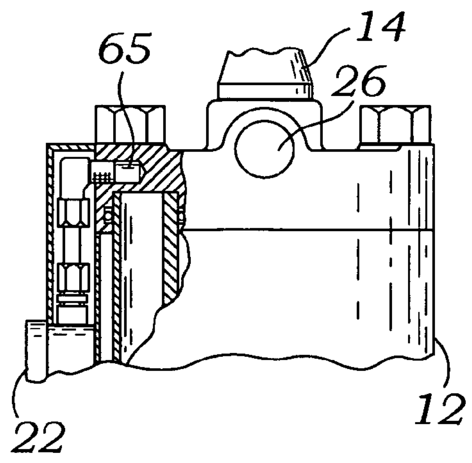

FIG. 4 is an elevation, partially in section, showing the upper head 13. A compressible fluid gauge outlet passage 65 connects the compressible fluid gauge 22 to the upper annular storage area.

FIG. 5 is a sectional view of the up-pump assembly 19. The up-pump assembly consists of a hollow body portion 80 to which is connected an extension body 81 at one end and a piston 82 at the other. A pump handle 83 having a knob 84 extends into the body of the piston 82 and is held in position by a set screw 85. A handle bearing 86 holds the handle 83 generally in position in the up-pump body 80 and reduces friction due to handle movement. The up-pump body 80 has a canted slot 87 indicated by the dotted line along which the handle 83 may be moved. A torsion spring 88 is connected between the piston and the pump body to rotatably return the piston to the position shown after it has been moved along the canted slot. Adjacent one end of the torsion spring 88 are a pair of flanges 89 which contain an O-ring 90. The hollow pump body 80 narrows adjacent the flanges 89 so that the flanges 89 and the O-ring 90 provide a seal. The hollow pump body 80 has a pair of hydraulic fluid inlets 91 extending therethrough. The portion of the piston 82 adjacent the hydraulic fluid inlets 91 is of smaller diameter than the inner diameter of the pump body 80 at that point, thereby providing an annular hydraulic fluid containing space 92. A second concentric hydraulic fluid containing space **92*a* obviates the necessity for aligning the inlets 91 with the inlet 59 (see FIG. 3**) of the lower head.

In the annular hydraulic fluid containing space 92, the piston has a pair of hydraulic fluid inlet passages 93 which open into a longitudinal storage passage 94 within the piston 82 so as to form a small hydraulic fluid storage space. The longitudinal passage 94 opens onto a larger diameter ball check valve passage 95. In the ball section valve passage 95 there is contained a ball 96 held in position by means of a ball check spring 97 so as to close the longitudinal storage passage 94. The ball check spring 97 is held in compression by means of a washer 98 positioned against a snap ring 99 which engages the outer surface of the ball check valve passage 95.

The extension body 81 has a hollow cylindrical central portion 100 and contains a ball 101 which is held against a check valve seat 102 in the form of a ring by a check valve spring 103. The ball 101 and check valve spring 103 are contained within the hollow central body portion 100 of the body extension 81 when the up-pump 19 is assembled. Two hydraulic fluid outlet holes 105 extend from the outer surface of the extension body 81 into the hollow central portion 100. A first O-ring 106, in cooperation with the cylindrical bore 41 of the lower head and a shoulder on the pump body 80, seals the hydraulic fluid contained in the annular storage area in one direction. A second O-ring 107 provides a hydraulic fluid seal between the inlet holes 91 and the outlet holes 105. A third O-ring 108 provides a seal for the hydraulic fluid contained adjacent the extension body 81.

An O-ring 109 seals the surface between the piston and body next to the inlet holes 93 in the direction of the extension body 81. An O-ring 110 seals the junction of the check valve 102, the extension body 81, and the pump body 80.

The up-pump is operated by rotating the up-pump handle 83. Due to the canted construction of the slot 87 which contains the handle 83, the piston 82 is driven toward the extension body 81 when the pump handle 83 is so rotated. Hydraulic fluid from the annular storage cylinder fills the inlet holes 91 and annular volume 92 associated therewith, together with the check valve inlet holes 93 and longitudinal storage passage 94. The hollow volume extending between the first ball 96 and the second ball 101 is filled with hydraulic fluid. The movement of the piston 82 towards the extension body 81 compresses this latter volume of hydraulic fluid to a pressure which exceeds the pressure existing in the cylinder 32. When the pressure exerted on this compressed volume between the check balls 96 and 101 exceeds the combined pressure existing in the cylinder 32 and the pressure exerted on the ball 101 by the check valve spring 103, the ball 101 moves against the check valve spring 103 to the extent required to compress the spring 103 to equalize for the excess in pressure existing in the fluid between the trapped check balls. However, the movement of the check ball 101 against the check ball spring 103 moves the check ball 101 away from the check valve seat 102 which the check ball 101 formerly sealed. Thereupon, the fluid trapped between the two check balls escapes through the outlet holes 105 into the annular volume existing between the up-pump assembly and the cylindrical bore 41 of the lower head 15 and then into the cylinder 32 through the up-pump outlet hole 60 (see FIG. 3). Hydraulic fluid will continue to so flow until the pressure existing in the fluid between the two check balls and the pressure existing in the fluid between the two check balls and the pressure existing in the cylinder is equalized. Thereupon, the ball 101 will be forced against the check valve seat 102 by the check valve spring 103, again sealing hydraulic fluid between the two check balls.

Release of the pump handle 83 allows the torsion spring 88 to return to the pump handle 83 to its normal position and retract the piston 82 from the advanced position resulting from the prior rotating movement of the pump handle. Retraction of the piston 82 reduces the pressure on the fluid trapped between the two check balls. Check ball 101 remains seated against the check valve seat 102 due to the pressure exerted by the fluid in the hollow central portion 100 of the extension body 81 against the ball 101. The ball 96 which heretofore closed the longitudinal passage 94 by the action of the compressed fluid trapped between the two check balls and also by the action of the check valve spring 95, is now moved away from the valve seat by the pressure exerted on the ball 96 by the fluid contained in the holes 91 and 93 and the longitudinal passage 94. When the hydraulic fluid contained between the two check balls 96 and 101 is at a pressure equal to that of the hydraulic fluid storage area 35, the ball 96 is moved by the check valve spring 97 to close the longitudinal passage 94.

Thus, fluid is extracted from the annular storage area and passed through the holes 91, 93 and the passage 94 around the check ball 96 and into the volume contained between the check balls 96 and 101. A subsequent movement of the pump handle, as previously described, will thereupon result in the repetition of the pumping cycle which was described above.

FIG. 6 is a sectional view of the down valve assembly 18. The down valve assembly 18 consists of a body 120 and a body extension 121 which together contain the various parts of the valve. A down valve handle 123 having a knob 124 inserted through the body 120 into the hollow central portion thereof. A valve actuator 125 is contained in the hollow central portion 122 of the body 120 and engages the handle 123. The handle 123 is held against the valve actuator 125 by means of a set screw 126. A torsion spring 127 is contained within the hollow cylindrical portion of the body 120 and is operable to return the valve handle 123 to the position shown when it has been rotated. A canted slot illustrated by the dotted line 128 allows the valve handle 123 to be rotated. A handle bearing 86' holds the handle 123 generally in position in the down valve assembly 120 and reduces friction due to handle movement. Rotation of the valve handle causes the actuator 125 to move toward the body extension 121. The actuator has a stem portion 129 extending through the hollow central portion 122 of body 120. A pair of outlet holes 130 extend through the body portion 120 and open into the hollow cylindrical central section 122. A seal of the hollow cylindrical central portion 122 in the direction of the valve handle 123 is formed by a pair of flanges 131 and an O-ring 132.

A valve seat 133 is located at the junction of the body 120 and the extension 121. A check valve piston 134 is contained within the check valve seat 133. The check valve piston 134 is of novel construction and illustrated in greater detail in FIG. 7. An O-ring 135 seals the junction between the body section 120, the extension section 121 and the valve seat 133.

The annular chamber formed by the hollow cylindrical central portion 122 of valve body 120 and the stem 129 preferably has dimensions such that its longitudinal cross section area is at least three times greater than its lateral cross sectional area with the valve handle in the position shown. The use of this chamber configuration provides the proper location of the inlet and outlet holes for the valve. A helper spring 136 located in the extension 121 holds the valve piston 134 against the valve seat 133. An O-ring 138 seals the outlet holes 130 in the direction of the valve handle. An O-ring 139 seals the outlet holes in the opposite direction. A pair of inlet holes 140 open into a hollow central portion 141 of the extension 121 between the helper spring 136 and the valve seat 133. An O-ring 142 provides a seal adjacent the inlet holes 140.

Figure 7:
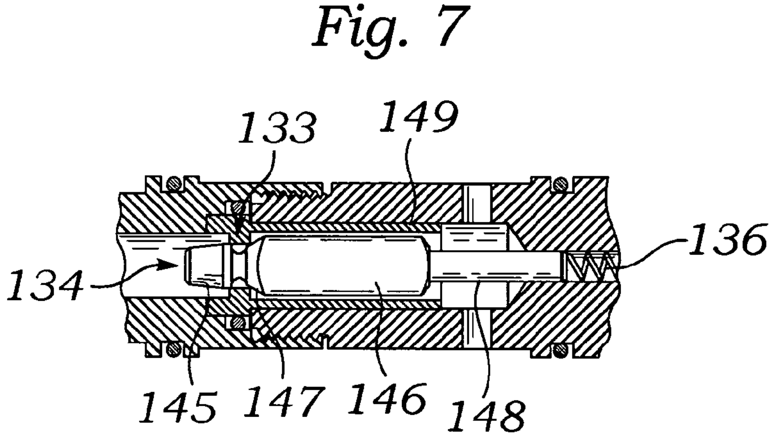
Figure 8:
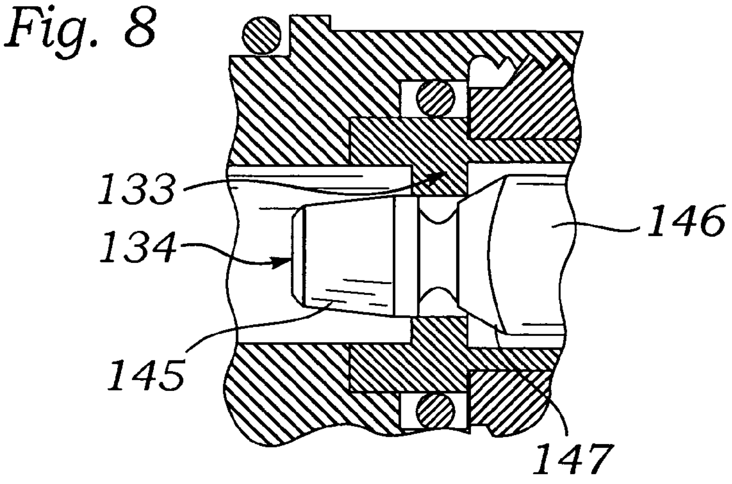

FIG. 7 shows in detail the construction of the valve piston 134 and valve seat 133. The valve piston 134 consists of a piston head 145 which is connected to the main body portion 146 by a shoulder 147. A stem 148 extends from the main body portion 146 in the opposite direction from the piston portion 145. The piston head 145 has a slight narrowing taper in the direction away from the main body portion 146.

It should be noted that the valve piston consists of an integral unit contained within the valve seat 133. The valve seat 133 has an annular portion 149 extending down the main body portion 146. The main body portion 146 preferably is constructed of square stock having slightly rounded edges. With such a construction, the extended annular portion 149 of the valve seat 133 surrounding the body portion 146 serves to align the head portion 145 and shoulder portion 147 with the orifice of the valve seat 133, while the stem projecting from the body portion 146 in the opposite direction from the head portion 145 serves to provide firm contact with the helper spring 136 contained in the extension 121.

Referring to FIG. 6, the operation of the down valve assembly will now be described. The down valve handle is rotated along the canted slot 128, driving the actuator 125 in the direction of the extension 121. The stem of the actuator is in contact with the face of the valve piston head portion 145. Prior to movement of the down valve handle 123, the valve seat 133 and the valve piston shoulder 147 form a seal to prevent movement of fluid from the inlet holes 140 through the valve assembly toward outlet holes 130. The movement of the piston 134 caused by the actuator stem 129 driving the piston stem 148 against the helper spring 136 opens the seal formed between the shoulder 147 and the valve seat 133. However, the piston head 145 is contained within the orifice of the valve seat 133. A small annular by-pass area between the piston head portion 145 and the valve seat 133 exists. This small annular volume allows the movement of hydraulic fluid from the inlet holes 140 to the outlet holes 130. As the rotation of the valve handle 123 continues, the piston head portion 145 is moved further back within the valve seat orifice. After the portion of the valve head portion 145 adjacent the shoulder 147 passes completely through the orifice, further movement of the valve head portion in this direction will result in an increase in the annular cross section available for the passage of hydraulic fluid, due to the taper of the valve head portion 145. Therefore, the rate of passage of fluid through the down valve assembly is proportional to the amount of rotation of the down valve handle after the constant rate displacement of the piston head has been exceeded.

When the pressures existing between the hydraulic fluid in the cylinder and the hydraulic fluid in the annular storage chamber are equal, no flow of fluid through the down valve assembly will occur. If the valve handle 123 is thereupon returned to the position shown in FIG. 6, the helper spring 136 will force the piston shoulder 147 against the valve seat 133, thereby again sealing the annular storage chamber against a further introduction of fluid from the hydraulic fluid of the cylinder. As was previously stated, the upper portion of the annular storage chamber contains a compressible fluid in a confined volume. When the tension causing the extension of the auxiliary hoist is removed, thereby releasing the pressure on the hydraulic fluid in the cylinder, the compressed fluid in the compressible fluid storage area 37 exerts a pressure on the hydraulic fluid in the hydraulic fluid storage area 35 which is greater than the pressure existing on the hydraulic fluid in the cylinder 32. The down valve assembly 18 thereupon commences to function as a dump-valve due to its unique construction. The hydraulic fluid under high pressure in the hydraulic fluid storage area 35 forces the piston head 145 to retract through the valve seat 133 orifice. Hydraulic fluid flows from the hydraulic fluid storage area 35, through the outlet holes 130, the valve seat 133 orifice, the inlet holes 140 and into the cylinder 32. This flow of fluid continues until the piston and rod have been completely retracted or until the pressures exerted upon the separator ring by the compressible fluid and by the hydraulic fluid are equalized.

Turning now to FIGS. 9-18, a precision load positioner apparatus 150 according to the present invention is shown. Precision load positioner apparatus 150 according to the present invention shares many structural and functional characteristics in common with auxiliary hoist control 11 described above. Thus the foregoing description of auxiliary hoist control 11 should be considered as part of the description of the present invention.

In an embodiment of load positioner 150 shown in FIGS. 9-18, cylinder head 13 is rotated 180 degrees with respect to body 12 from the orientation shown in FIG. 2, thus interchanging the relative position of gas filler plug 25 and air breaker cap 26. The orientation of cylinder head of course is a matter of ordinary design choice, and has no effect upon the function of apparatus 150.

Figure 9:
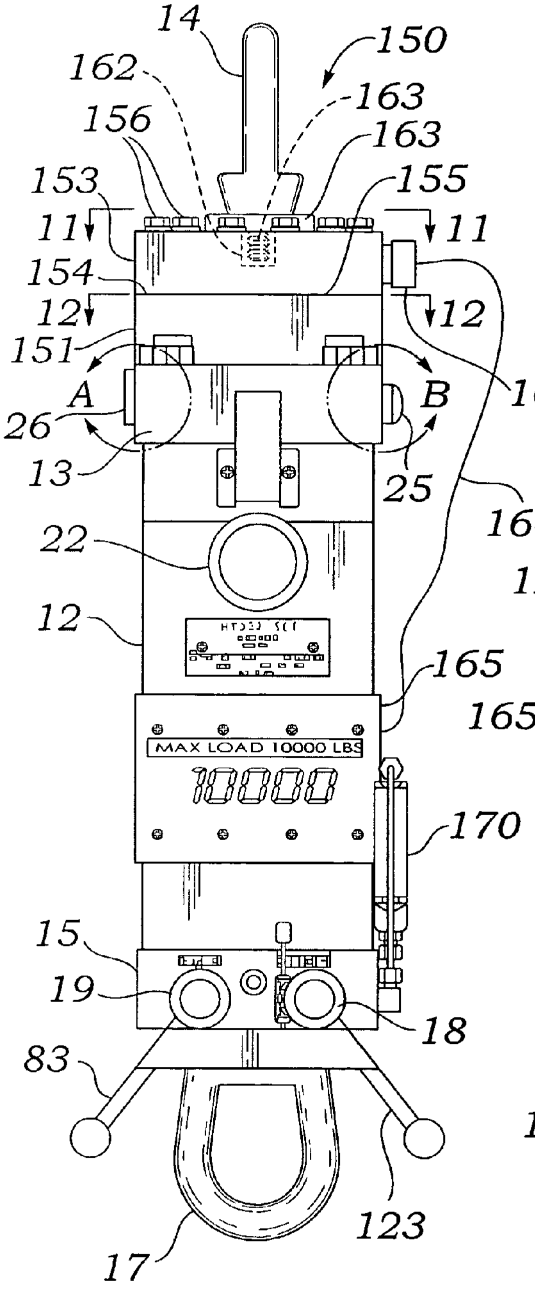
Figure 10:
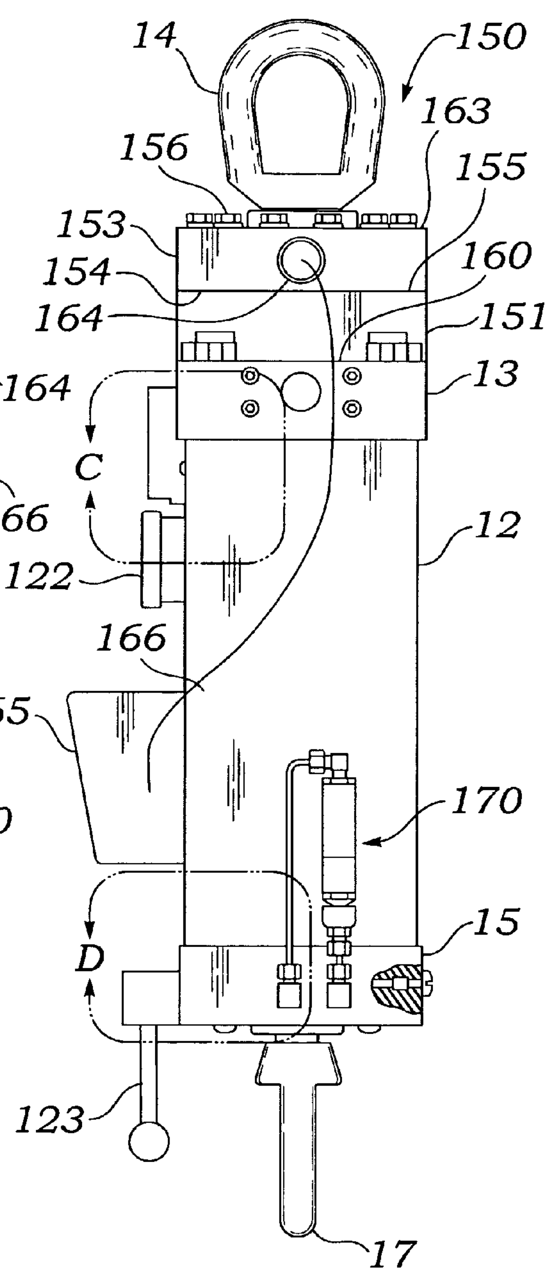
Figure 12:
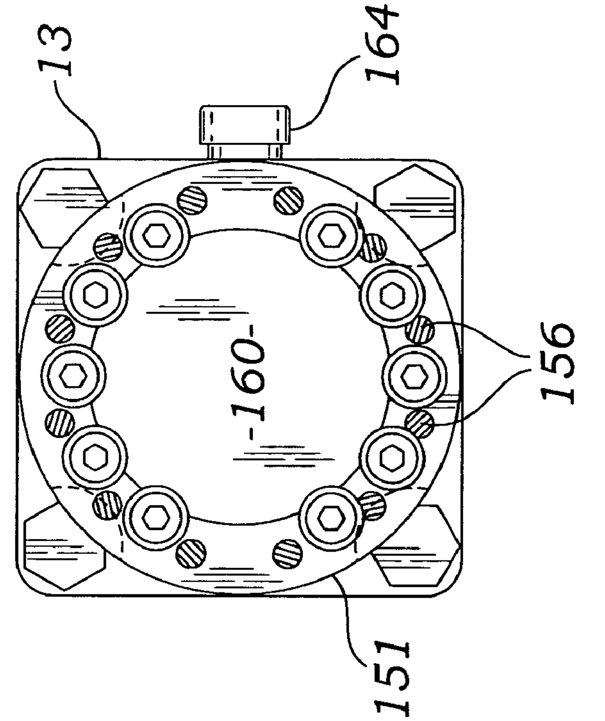
Figure 11:
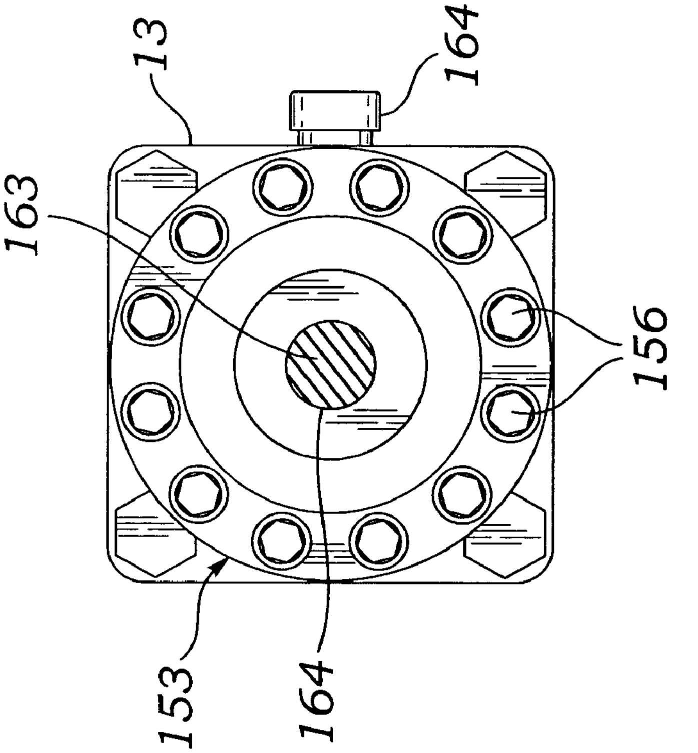
Figure 14:
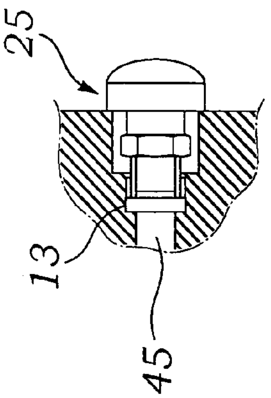
Figure 16:
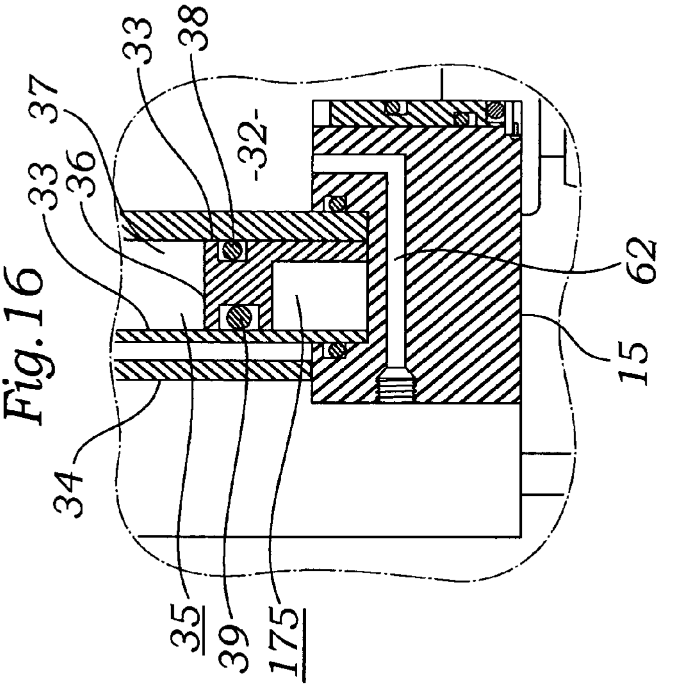
Figure 13:
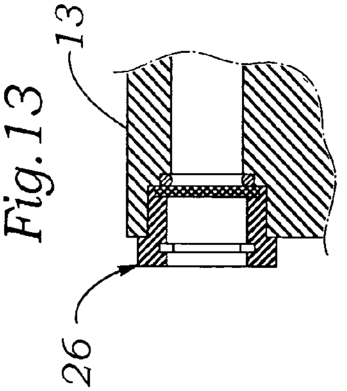
Figure 15:
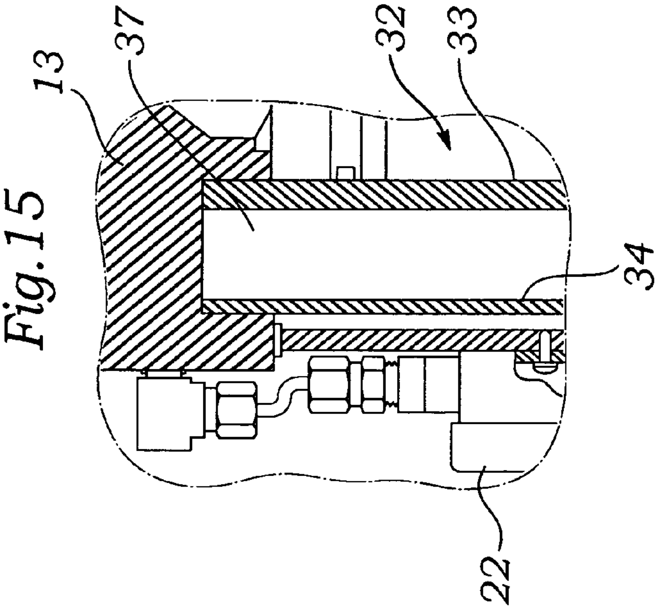

Referring to FIGS. 9-11, a precision load positioner apparatus 150 according to the present invention may be seen to include a spacer ring 151 which protrudes upwardly from the upper surface 152 of upper cylinder head 13 of apparatus body 12. Spacer ring 151 has the shape of a right-circular annular ring. Apparatus 150 also includes a load cell 153 which has the shape of a squat right-circular cylinder which has a flat, horizontal lower surface 154 that seats on a flat upper surface 155 of the spacer ring 151. Load cell 153 and spacer ring 151 are secured together and to the upper cylinder head 13 by a plurality of bolts 156 which are arranged in a circular pattern, the bolts having shanks 157 which protrude downward through clearance holes 158 disposed through spacer ring 151, and which are tightened into threaded blind bores 159 disposed vertically downwards into upper cylinder head 13 from the upper surface 160 of the cylinder head.

Upper anchor connector eye 14 of apparatus 150 has a downwardly depending threaded shank which is screwed into a threaded bore 162 that extends downwardly into the center of upper surface 163 of the load cell. Load cell 153 produces at an electrical output port 164 thereof an output voltage which is proportional to tensional force exerted between upper connector eye 14 and the load cell. A particular device found suitable for the use as load cell 153 in the present invention is a Model 1200 Pressure Series universal load cell, manufactured by Interface Company, 7401 East Butherus Drive, Scottsdale, Ariz. 85260, which utilizes temperature compensated strain gages to produce an output voltage proportional to tensional forces exerted on the device. That output voltage is input to a digital display device 165 by means of an electrical cable 166. Digital display device 165, which is preferably a Light Emitting Diode (LED) type has an internal signal processor amplifier, powered by internal batteries, which scales voltages output from load cell 153, and converts those voltages to weight force readings in pounds, kilograms, or decanewtons of force, selectable by a range selection switch. None of the foregoing components of display device 165 are shown nor need further description, since the design and construction of such features are commonly known to those skilled in the art.

As shown in FIGS. 9 and 10, digital display device 165 is physically positioned on body 12 of precision load positioner apparatus 150 in place of the hydraulic pressure gauge 21 used in auxiliary hoist control 11 shown in FIG. 1. And, as has been described above, without hydraulic pressure gauge 21, there is no indication to an operator that he might be over-pressurizing inner cylinder 32 with hydraulic fluid. Thus, if an operator oscillates up-pump handle 83 to retract piston 30 upwards in inner cylinder 32, the operator will have no indication of over-pressurizing cylinder 32. Therefore, the operator may inadvertently operate up-pump 19 a sufficient number of cycles to increase the hydraulic pressure in cylinder 32 below piston 30 to a value which exceeds design limits of the apparatus, thus blowing O-ring seals and causing damage to the apparatus. Over-pressurization of the hydraulic cylinder can occur in normal operation when the piston within the inner cylinder is at the upward limit of its travel, abutting the upper cylinder head, and the operator continues to operate the up-pump. To prevent such an occurrence, precision load positioner apparatus 150 is provided with a pressure relief valve, as will now be described.

Figure 18:
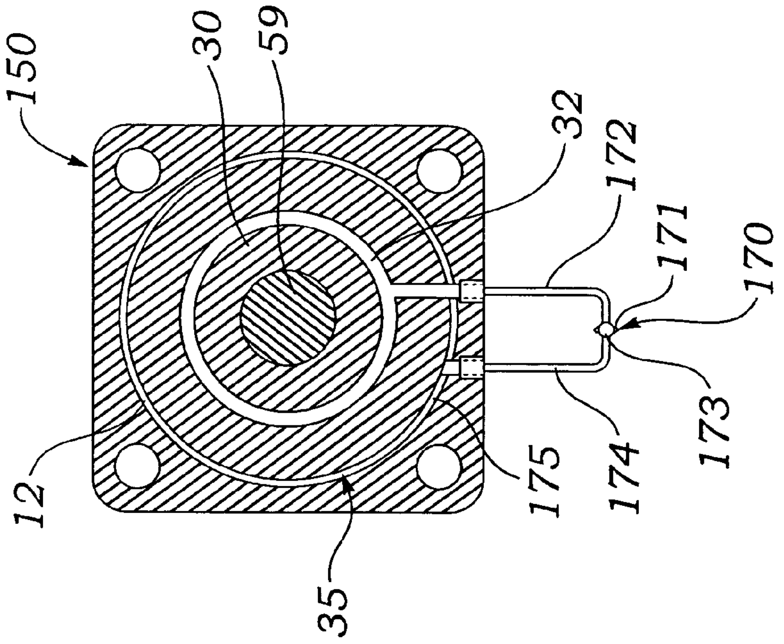
Figure 17:
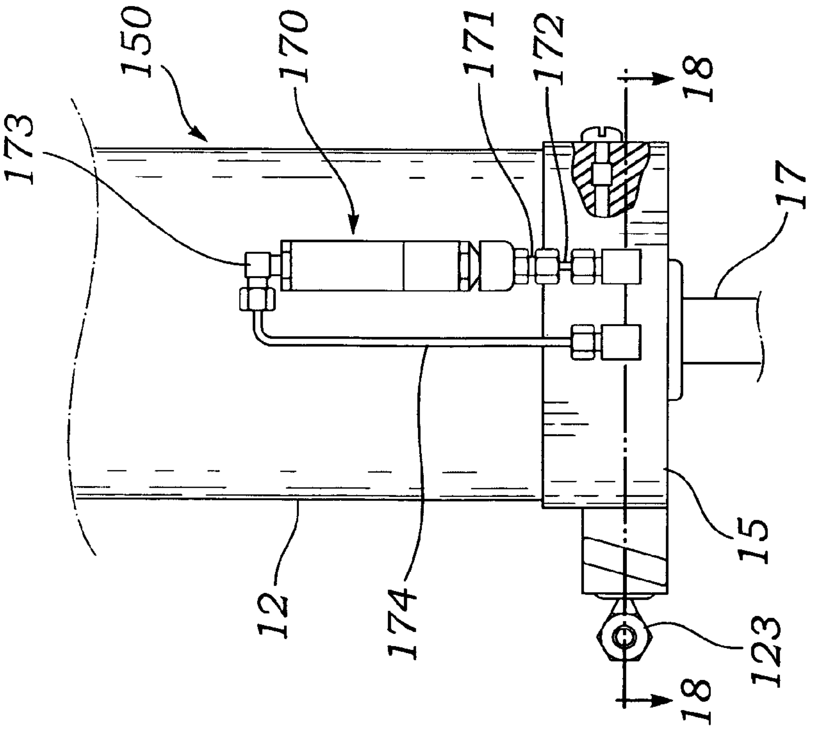

Referring to FIGS. 9, 10 and 17-18, precision load positioner apparatus 19 may be seen to include a pressure relief valve 170. As shown in FIG. 18, pressure relief valve 170 has an inlet port 171 connected through a hydraulic fluid inlet tube 172 to inner cylinder 32. Pressure relief valve 170 also has an outlet port 173 connected through a hydraulic fluid outlet tube 174 to the lower portion 175 of annular fluid reservoir storage chamber 35 below separator ring 36 and between inner cylinder wall 33 and outer cylinder wall 34.

The design and construction of pressure relief valve 170 are selected so that the actuation or “cracking” pressure that opens the valve to permit pressurized flow of hydraulic fluid from inner cylinder 32 to fluid reservoir storage chamber 35 between the inner cylinder and outer cylinder 34 is slightly above the design limit for a particular size positioner apparatus 150. Thus, for example, a “5-ton, Model C” version of apparatus 150 according to the present invention has the following parameters:

| | |
|---|---|
| Effective lower surface area of piston 30: | 6.285 square inches |
| Maximum Pressure With Inner Cylinder 32: | |
| Load 10,000 lbs | Pressure 1,590 psi |
| 5,000 kg | 1,753 psi |
| 5,000 dn (Deca Newtons) | 1,787 psi |

Accordingly, since the apparatus 150 according to the present invention is designed and constructed so as to operate safely at a certain margin above its maximum rated capacity of 5,000 decanewtons, relief valve 170 would be selected to have an actuation or cracking pressure of about 10% above 1,787 psi, i.e., about 2000 psi. Preferably, pressure relief valve 170 is of a throttling, or variable flow rate type. Thus, if the pressure is increased above the threshold actuation or cracking pressure, the flow rate increases. Therefore, if the up-pump inadvertently continues to be operated to over-pressure cylinder 32, the flow rate of hydraulic fluid from inner cylinder 32 into fluid reservoir storage chamber 35 increases. This increased flow rate prevents over-pressurization of inner cylinder 32 in spite of continued over operation of up-pump 19. A valve found suitable for use as pressure relief valve 170 is the Model 5120 Series Inline Relief Valve, manufactured by Circle Seal Controls, Inc., 2301 Wardlow Circle, Corona, Calif. 92880.

What is claimed is:

1. A precision load positioner apparatus for bidirectionally translating and positioning loads under tension, said apparatus comprising;

a. a hydraulic force actuator including, (i) a first, inner cylinder having a first, upper cylinder head, and a second, lower cylinder head, (ii) a piston longitudinally slidably located within said inner cylinder, (iii) a first, upper anchor connector fixedly attached to said upper head, (iv) a piston rod fixed to said piston which protrudes slidably through said lower head, and (v) a second, lower load connector fixed to a lower end of said piston rod, b. an accumulator comprising an outer cylinder having a lower volume forming a hydraulic fluid reservoir and an upper compressible fluid storage volume, said upper and lower storage volumes being separated by a hermetically sealing separator ring longitudinally slidably located within said outer cylinder, c. an up-pump mechanism for pumping hydraulic fluid from said hydraulic fluid reservoir volume of said outer cylinder into a volume of said inner cylinder between said lower head and said piston, to thereby retract said piston rod inwardly into said inner cylinder, d. a down-valve mechanism for transferring hydraulic fluid from said inner cylinder to said reservoir to thereby enable extension of said piston rod outwardly from said cylinder in response to tensional load exerted on said load connector relative to said anchor connector, e. a load cell fixed between said upper cylinder head and said upper connector, said load cell providing an output voltage proportional to tensional force exerted between said upper and lower connectors, and f. a display device for converting said output voltage from said load cell to a visually readable number proportional to said tensional force.

2. The apparatus of claim 1 further including a pressure relief valve having an inlet port which communicates through an inlet fluid passageway with said hydraulic fluid within said inner cylinder and said hydraulic fluid reservoir, said pressure relief valve having an opening pressure which is a predetermined small increment above a rated design maximum load pressure within said inner cylinder, whereby over-pressurization of hydraulic fluid within said inner cylinder is limited to a predetermined small value by opening of said pressure relief valve to thereby effect transfer of fluid from said inner cylinder to said reservoir.

3. The apparatus of claim 2 further including a dump-valve mechanism effective in conducting fluid from said reservoir to said inner cylinder when compressible gas pressure exerted on said separator ring exceeds hydraulic fluid pressure within said inner cylinder, whereby said piston is retracted when a tensional load on said lower connector is reduced below a predetermined value.

4. The apparatus of claim 3 wherein said dump-valve mechanism is an integral part of said down-valve assembly.

5. The apparatus of claim 1 wherein said outer cylinder is coaxial with said inner cylinder.

6. The apparatus of claim 5 wherein said upper and lower storage volumes have an annular cross-sectional shape.

7. The apparatus of claim 6 wherein said separator ring has an annular shape.

8. The apparatus of claim 1 further including a compressible fluid pressure gauge having an inlet port in hermetically sealed communication with said upper compressible fluid storage volume of said outer cylinder.

9. The apparatus of claim 1 further including a vent port for venting to the atmosphere air between the upper face of said piston and said upper cylinder head.

10. The apparatus of claim 1 further including a compressible fluid filler port which communicates with said compressible fluid storage volume, whereby a compressible gas is transferable to and from said compressible fluid storage volume to thereby adjust pressure within said compressible fluid storage volume to a value which produces a selectable return spring pressure on said separator ring to thereby effect retraction of said piston upon reduction of a tensional load on said lower connector below a predetermined value.

11. A precision load positive apparatus for bidirectionally translating and positioning loads under tension, said apparatus comprising;

a. a hydraulic force actuator including, (i) a first, inner cylinder having a first, upper cylinder head, and a second, lower cylinder head, (ii) a piston longitudinally slidably located within said inner cylinder, (iii) a first, upper anchor connector fixedly attached to said upper head, (iv) a piston rod fixed to said piston which protrudes slidably through said lower head, and (v) a second, lower load connector fixed to a lower end of said piston rod, b. an accumulator comprising an outer cylinder having a lower volume forming a hydraulic fluid storage reservoir and an upper-compressible fluid storage volume, said upper and lower storage volumes being separated by a hermetically sealing separator ring longitudinally slidably located within said outer cylinder, c. an up-pump assembly for pumping hydraulic fluid from said hydraulic fluid reservoir of said outer cylinder into a volume of said inner cylinder between said lower head and said piston, to thereby retract said piston rod inwardly into said inner cylinder, d. a down-valve assembly for transferring hydraulic fluid from said inner cylinder to said reservoir to thereby enable extension of said piston rod outwardly from said cylinder in response to tensional load exerted on said load connector relative to said anchor connector, e. a load cell fixed between said upper cylinder head and said upper connector, said load cell providing an output voltage proportional to tensional force exerted between said upper and lower connectors, f. a display device for converting said output voltage from said load cell to a visually readable number proportional to said tensional force, and g. a pressure relief valve having an inlet port which communicates through an inlet fluid passageway with said hydraulic fluid within said inner cylinder and said hydraulic fluid reservoir, said pressure relief valve having an opening pressure which is a predetermined small increment above a rated design maximum load pressure within said inner cylinder, whereby over-pressurization of hydraulic fluid within said inner cylinder is limited to a predetermined small value by opening of said pressure relief valve to thereby effect transfer of fluid from said inner cylinder to said reservoir.

12. The apparatus of claim 11 further including a dump-valve mechanism effective in conducting fluid from said reservoir to said inner cylinder when compressible gas pressure exerted on said separator ring exceeds hydraulic fluid pressure within said inner cylinder, whereby said piston is retracted when a tensional load on said lower connector is reduced below a predetermined value.

13. The apparatus of claim 11 wherein said outer cylinder is coaxial with said inner cylinder.

14. The apparatus of claim 13 wherein said upper and lower storage volumes have an annular cross-sectional shape.

15. The apparatus of claim 14 wherein said separator ring has an annular shape.

16. In a precision load positioner apparatus for bidirectionally translating and positioning loads under tension, said apparatus comprising;

a. a hydraulic force actuator including,
  (I) a first, inner cylinder having a first, upper cylinder head, and a second, lower cylinder head,
  (ii) a piston longitudinally slidably located within said inner cylinder,
  (iii) a first, upper anchor connector fixedly attached to said upper head,
  (iv) a piston rod fixed to said piston which protrudes slidably through said lower head, and
  (v) a second, lower load connector fixed to a lower end of said piston rod, b. an accumulator comprising an outer cylinder having a lower volume forming a hydraulic fluid storage reservoir and an upper compressible-fluid storage volume, said upper and lower storage volumes being separated by a hermetically sealing separator ring longitudinally slidably located within said outer cylinder, c. an up-pump mechanism for pumping hydraulic fluid from said hydraulic fluid reservoir of said outer cylinder into a volume of said inner cylinder between said lower head and said piston, to thereby retract said piston rod inwardly into said inner cylinder, d. a down-valve mechanism for transferring hydraulic fluid from said inner cylinder to said reservoir, an improvement comprising;
  (I) a load cell fixed between said upper cylinder head and said upper connector, said load cell for providing an output voltage proportional to tensional force exerted between said upper and lower connectors, and
  (ii) a display device for converting said output voltage from said load cell to a visually readable number proportional to said tensional force.

17. The apparatus of claim 16 further including a pressure relief valve having an inlet port which communicates through an inlet fluid passageway with said hydraulic fluid within said inner cylinder and said hydraulic fluid reservoir, said pressure relief valve having an opening pressure which is a predetermined small increment above a rated design maximum load pressure within said inner cylinder, whereby over pressurization of hydraulic fluid within said inner cylinder is limited to a predetermined small value by opening of said pressure relief valve to thereby effect transfer of fluid from said inner cylinder to said reservoir.

18. The apparatus of claim 17 further including a dump-valve mechanism effective in conducting fluid from said reservoir to said inner cylinder when compressible gas pressure exerted on said separator ring exceeds hydraulic fluid pressure within said inner cylinder, whereby said piston is retracted when a tensional load on said lower connector is reduced below a predetermined value.

19. The apparatus of claim 16 wherein said outer cylinder is coaxial with said inner cylinder.

20. The apparatus of claim 19 wherein said upper and lower storage volumes have an annular cross-sectional shape.

* * * * *